R. S. BROWN.
SPINDLE ADJUSTING MECHANISM.
APPLICATION FILED APR. 24, 1912.
1,103,479.
Patented July 14, 1914.
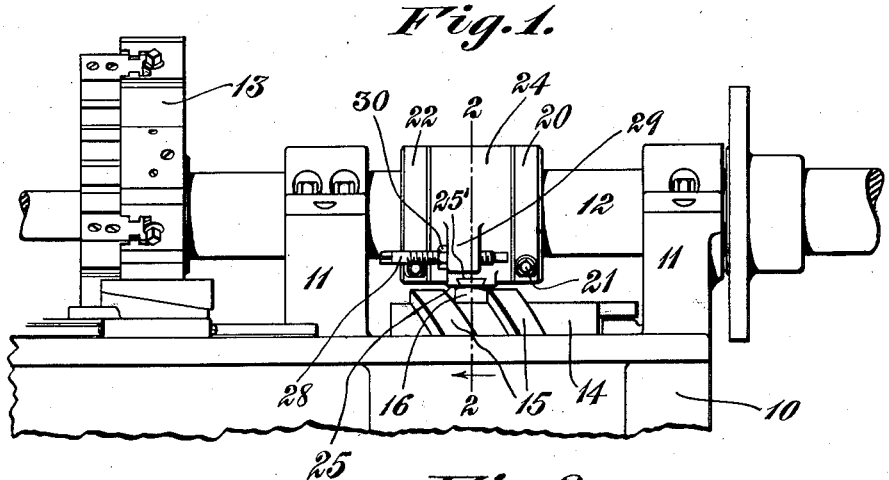
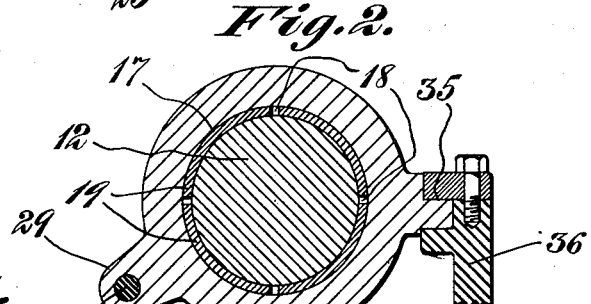
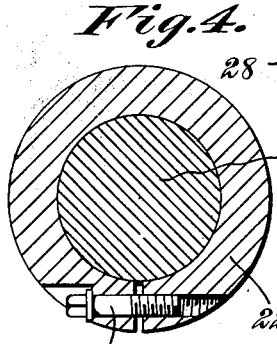
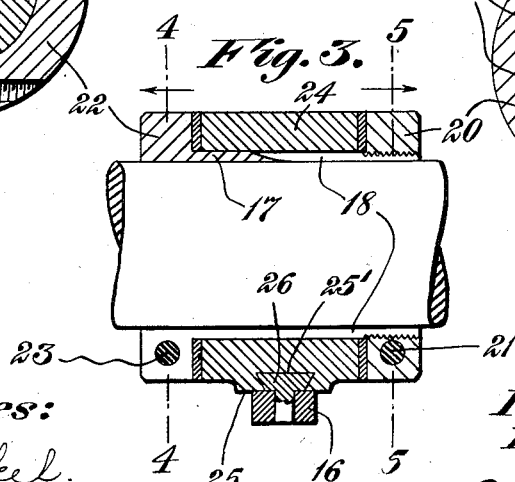
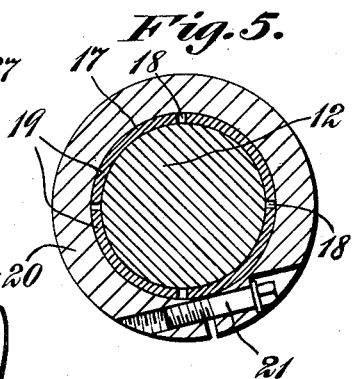
Witnesses:
Inventor:
Robt. S. Brown
By his Attorneys,

UNITED STATES PATENT OFFICE.

ROBERT S. BROWN, OF NEW BRITAIN, CONNECTICUT, ASSIGNOR TO THE NEW BRITAIN MACHINE COMPANY, OF NEW BRITAIN, CONNECTICUT, A CORPORATION OF CONNECTICUT.

SPINDLE-ADJUSTING MECHANISM.

1,103,479.  Specification of Letters Patent.  Patented July 14, 1914.

Application filed April 24, 1912. Serial No. 692,821.

*To all whom it may concern:*

Be it known that I, ROBERT S. BROWN, a citizen of the United States, residing at New Britain, in the county of Hartford and State of Connecticut, have invented certain new and useful Improvements in Spindle-Adjusting Mechanism, of which the following is a specification.

This invention relates to spindle adjusting mechanism, the object of the invention being to provide a simple and effective means for adjusting the relation between a spindle or equivalent movable member and an operating cam therefor by which the point at which the spindle or some member carried thereby initiates a certain operation can be easily and readily governed, and this particular construction is susceptible of advantageous use in many different connections, although it is of particular utility when employed in conjunction with the endwise movable work-turret-carrying spindle or barrel, such as shown in United States Patent No. 874,035 to G. G. Prentice of December 17, 1907 to which reference may be had. In this particular use the mechanism is employed for regulating the point at which the work turret commences its advancing movement.

The machine possesses other features of novelty and advantage which with the foregoing will be set forth at length in the following description where I will outline in detail that one of the several forms of embodiment of the invention which I have selected for illustration in the drawings accompanying and forming part of the present specification, this disclosure being primarily provided to enable those skilled in the art to practice the invention. From this it will be obvious that I do not restrict myself to said disclosure; I may depart therefrom in several respects within the scope of the invention defined by the claims following said description.

Referring to said drawings: Figure 1 is a side elevation of a portion of a multiple spindle automatic turret machine provided with mechanism involving my invention. Fig. 2 is a transverse section on the line 2—2 of Fig. 1. Fig. 3 is a longitudinal sectional view through the sleeve, band and nut hereinafter particularly described, said parts being in operative relation and said view also showing a portion of a spindle. Figs. 4 and 5 are transverse sections on the lines 4—4 and 5—5 respectively of Fig. 3.

Like characters refer to like parts throughout the several views.

The different parts of the machine may be supported in any desirable manner; for this purpose the bed 10 may be provided, although only a part of the same is shown. From the bed there are shown rising the bearings 11 which support for endwise reciprocation, the turret spindle or barrel 12 provided with a rigid work turret 13. This turret and spindle 12 operate precisely like the corresponding parts and are equipped with the same adjuncts shown in said Letters Patent. For reciprocating the spindle 12 and correspondingly operating the turret 13, the rotary cam drum 14 may be provided, and this cam drum is also illustrated in said patent. Said cam drum is shown provided with cam strips 15 adapted to operate upon a stud 16 connected with the spindle 12. The stud 16 is shown consisting of an anti-friction roller, and it is associated with the spindle 12 in a novel manner as will hereinafter appear.

It is necessary in a machine such as shown in the patent mentioned to so adjust the turret 13 that the work thereon will be in position to have the tools begin their action at a predetermined point, and this adjustment has heretofore generally been accomplished by adjusting the cam strips 15 and this as is apparent, is an operation which is exceedingly troublesome and which requires considerable time. In the organization shown the difficulties mentioned are wholly eliminated, and this is accomplished by providing for the adjustment of the stud 16 longitudinally of the spindle 12, in any suitable manner, although means for accomplishing this particular result will be hereinafter more particularly described.

Fitted to the spindle 12 between the ends thereof, is a sleeve 17 adjustable longitudinally thereof, means being provided to securely clamp said sleeve to said spindle. The sleeve has several longitudinally-extending slots 18 which thus produce somewhat resilient tongues 19, and these tongues are caused by suitable means to solidly and tightly embrace the spindle 12. For this purpose the split or divided nut 20 may be provided, said nut in the construction shown being in engagement with external threads on the rear terminal portion of the sleeve 17 and being provided with a clamping screw 21. By setting up the screw 21, the nut 20 will be constricted around the rear threaded end of the sleeve 17 and will thus cause the tongues 19 to substantially hug the spindle 12. The head or collar 22 at the inner or forward end of the sleeve 17 is also split or divided and is itself adapted to be drawn into substantial, firm contact with the spindle at a point relatively remote from the nut 20, by the clamping screw 23 or otherwise. The sleeve 17 is, therefore, clamped securely to the spindle at longitudinally separated points, and this insures proper taking up of thrust during cutting. Between the relatively fixed collar 22 and the nut 20 which constitutes an adjustable collar, is the band or ring 24 which freely fits around the body of the sleeve 17 and which has a peripherally flattened portion or face 25 having a dove-tail groove 25' to receive the correspondingly shaped supporting body or carrier 26 for the stud or anti-friction roller 16, dowel pins 27 being provided to aid in rigidly securing said carrier in position.

It should be explained that while the sleeve 17 and nut 20 rotate with the spindle 12, the band or ring 24 does not, the sleeve 17 turning in the sleeves during the rotation of the spindle. The band, therefore, is not clamped between the two collars 20 and 22. It will be clear that the collar or nut 20 and the collar 22 present a suitable means for receiving thrust of the non-rotative band 24 when the same is moved in the direction of the longitudinal axis of the spindle 12 to thus impart corresponding movements to the spindle. Any desirable means may be provided for preventing rotation of the band 24, although those shown will now be described. Said band is shown as gibbed as at 35 to the flange or plate 36 rising from the bed 10, and while the gibbed construction prevents rotation of the band 24, it does not prevent free movement of said band in the direction of the longitudinal axis of the spindle 12.

It will be assumed that it is desired to adjust the point at which the tools are to operate on the work held by the turret 13; in this event with the construction shown, the following procedure may be adopted: The screws 21 and 23 are first loosened thereby relieving the clamping effect of the two collars 20 and 22 on the spindle 12 after which the spindle can be moved inwardly or outwardly as required the turret 13 being carried therewith, and when the turret is in proper relation, the two screws will be set up. This operation is one which can be readily and quickly performed.

Means are provided, preferably in the shape of a stop, for preventing the tools from biting into the work, after they have performed their normal actions, and in the present case the stop for this purpose is carried upon the band 24 being preferably adjustable and consisting as shown of a screw 28 tapped through a projection 29 extending laterally from the circumference of the band 24 and held in an adjusted position by the nut 30 thereon which is adapted to engage the adjacent side of the projection 29. The head of the stop or screw 28 is adapted to engage the inner bearing 11 when the cutters or tools on the turret 13 have finished their work, and this point can be readily regulated by the adjustment of the screw 28.

What I claim is:

1. A machine of the class described comprising a rotary endwise-movable spindle, a sleeve longitudinally adjustable on the spindle, provided with collars both connected directly with said sleeve and also with means for clamping the sleeve to the spindle, a band encircling the sleeve between the collars, mechanism acting against said band to reciprocate the spindle, and means for preventing the rotation of said band with said sleeve during the longitudinal movement of the spindle and sleeve.

2. A machine of the class described, comprising a rotary endwise-movable spindle, a split sleeve provided with a rigid collar, a divided collar threaded onto the split portion of the sleeve, for constricting said sleeve into clamping engagement with the spindle, a band between the two collars, means acting against the band and the band acting against the collars, for reciprocating said spindle, and means for preventing the rotation of said band with said sleeve as the spindle is reciprocated.

3. A machine of the class described, comprising a rotary endwise movable spindle, a sleeve longitudinally adjustable on the spindle, provided with collars, one of which is integral therewith and the other of which is threaded thereonto, said sleeve being also provided with means for clamping the same to the spindle, a band encircling the sleeve between the collars, mechanism acting against the band to reciprocate the spindle, and means for preventing the rotation of said band with said sleeve during the longitudinal movement of the spindle and sleeve.

4. A machine of the class described, comprising a rotary endwise movable spindle, a split sleeve provided with an integral collar, and a divided collar threaded on to the split portion of the sleeve, the split portion of the sleeve extending through said integral collar, means for drawing the two collars into clamping engagement with the spindle, a band between the collars, means acting against the band and the band acting against the collars, for reciprocating the spindle, and means for preventing the rotation of said band with said sleeve as the spindle is reciprocated.

In testimony whereof I affix my signature in presence of two witnesses.

ROBERT S. BROWN.

Witnesses:
HEATH SUTHERLAND,
H. H. PEARE.